United States Patent
Xu et al.

(10) Patent No.: US 9,396,539 B2
(45) Date of Patent: Jul. 19, 2016

(54) METHODS AND APPARATUSES FOR FACE DETECTION

(75) Inventors: Lei Xu, Beijing (CN); Kongqiao Wang, Helsinki (FI); Jiangwei Li, Beijing (CN); Jimmy Wah Tung Wan, Tokyo (JP); Jiunn Bay, Takane-cho (JP)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 13/639,045

(22) PCT Filed: Apr. 2, 2010

(86) PCT No.: PCT/CN2010/000434
§ 371 (c)(1),
(2), (4) Date: Oct. 2, 2012

(87) PCT Pub. No.: WO2011/120206
PCT Pub. Date: Oct. 6, 2011

(65) Prior Publication Data
US 2013/0022243 A1    Jan. 24, 2013

(51) Int. Cl.
*G06K 9/46* (2006.01)
*G06T 7/00* (2006.01)
*G06K 9/00* (2006.01)

(52) U.S. Cl.
CPC .......... *G06T 7/0044* (2013.01); *G06K 9/00228* (2013.01); *G06K 9/00261* (2013.01); *G06K 9/4642* (2013.01); *G06K 2009/4666* (2013.01); *G06T 2207/20081* (2013.01); *G06T 2207/30201* (2013.01)

(58) Field of Classification Search
USPC ......... 382/103, 115, 116, 117, 118, 190, 195, 382/313, 305
See application file for complete search history.

(56) References Cited

U.S. PATENT DOCUMENTS

| | | | | |
|---|---|---|---|---|
| 5,497,150 A | * | 3/1996 | Kimura | G06F 3/03543 341/1 |
| 5,852,669 A | * | 12/1998 | Eleftheriadis et al. | 382/118 |
| 5,892,595 A | * | 4/1999 | Yamakawa | H04N 1/486 358/504 |
| 6,671,391 B1 | * | 12/2003 | Zhang et al. | 382/118 |
| 7,103,227 B2 | * | 9/2006 | Raskar et al. | 382/266 |

(Continued)

FOREIGN PATENT DOCUMENTS

| | | |
|---|---|---|
| CN | 1341401 A | 3/2002 |
| CN | 101206715 A | 6/2008 |

(Continued)

OTHER PUBLICATIONS

Brown et al. International Journal of Computer Vision 74(1), 59-73, 2007_c 2007 Springer Science + Business Media, LLC. Manufactured in the United States. p. 1-7.*

(Continued)

*Primary Examiner* — Chan Park
*Assistant Examiner* — Mia M Thomas
(74) *Attorney, Agent, or Firm* — Alston & Bird LLP

(57) ABSTRACT

Methods and apparatuses are provided for face detection. A method may include selecting a face detection parameter subset from a plurality of face detection parameter subsets. Each face detection parameter subset may include a subset of face posture models from a set of face posture models and a subset of image patch scales from a set of image patch scales. The method may further include using the selected face detection parameter subset for performing face detection in an image. Corresponding apparatuses are also provided.

28 Claims, 10 Drawing Sheets

(56) References Cited

U.S. PATENT DOCUMENTS

| | | | |
|---|---|---|---|
| 7,315,631 B1 | 1/2008 | Corcoran et al. | |
| 7,742,657 B2* | 6/2010 | Kim | G06K 9/20 345/419 |
| 8,447,132 B1* | 5/2013 | Galil | 382/274 |
| 8,731,327 B2* | 5/2014 | Uehara | 382/284 |
| 8,792,679 B2* | 7/2014 | Sengupta et al. | 382/103 |
| 8,902,328 B2* | 12/2014 | Vidal-Naquet | 348/222.1 |
| 2002/0150291 A1* | 10/2002 | Naf et al. | 382/162 |
| 2003/0012414 A1* | 1/2003 | Luo | 382/118 |
| 2005/0180627 A1* | 8/2005 | Yang et al. | 382/159 |
| 2006/0147108 A1* | 7/2006 | Kee | G06K 9/00228 382/159 |
| 2007/0098264 A1* | 5/2007 | Van Lier | G06K 9/50 382/199 |
| 2007/0126884 A1* | 6/2007 | Xu | G06K 9/00221 348/220.1 |
| 2007/0286488 A1* | 12/2007 | Fukuda | H04N 5/23219 382/190 |
| 2007/0286490 A1* | 12/2007 | Danowitz | 382/195 |
| 2009/0073314 A1* | 3/2009 | Uemukai | G11B 27/034 348/468 |
| 2009/0231458 A1 | 9/2009 | Moriyama | |
| 2010/0103476 A1* | 4/2010 | Yashiro | 358/464 |
| 2010/0142762 A1* | 6/2010 | Morita | 382/115 |
| 2010/0195911 A1* | 8/2010 | Yen | G06K 9/00234 382/190 |
| 2010/0284568 A1* | 11/2010 | Tojo | 382/103 |
| 2010/0295962 A1* | 11/2010 | Terauchi | 348/222.1 |
| 2010/0328442 A1* | 12/2010 | Yang et al. | 348/77 |
| 2011/0058032 A1* | 3/2011 | Park | G06K 9/00228 348/139 |
| 2011/0173662 A1* | 7/2011 | Beppu | H04N 21/466 725/46 |
| 2012/0321128 A1* | 12/2012 | Medioni | G06K 9/00771 382/103 |
| 2013/0022243 A1* | 1/2013 | Xu et al. | 382/103 |
| 2013/0114853 A1* | 5/2013 | Sengupta | G06K 9/00248 382/103 |
| 2014/0037144 A1* | 2/2014 | Hiramaki | G06K 9/00248 382/103 |
| 2014/0286527 A1* | 9/2014 | Harthattu | G06K 9/00228 382/103 |
| 2015/0302240 A1* | 10/2015 | Rao | G06K 9/00248 382/201 |

FOREIGN PATENT DOCUMENTS

| | | | | |
|---|---|---|---|---|
| CN | 101499128 A | 8/2009 | | |
| CN | 101534393 A | 9/2009 | | |
| EP | 2 107 500 A2 | 10/2009 | | |
| KR | 10-2009-12805515 | * | 9/2009 | H04N 7/18 |
| WO | 2006/025272 A1 | 3/2006 | | |

OTHER PUBLICATIONS

Schapire et al. Machine Learning, 37, 297-336 (1999) 1999 Kluwer Academic Publishers. Manufactured in The Netherlands p. 1-40.*
Li et al., "FloatBoost Learning and Statistical Face Detection", IEEE Transactions on Pattern Analysis and Machine Intelligence, vol. 26, Issue 9, Sep. 2004, pp. 1-12.
Wang et al., "Multi-View Face Detection under Complex Scene based on Combined SVMs", Proceedings of the 17th International Conference on Pattern Recognition, vol. 4, Aug. 23-26, 2004, 4 pages.
Terrillon et al., "DRUIDE: A Real-Time System for Robust Multiple Face Detection, Tracking and Hand Posture Recognition in Color Video Sequences", Proceedings of the 17th International Conference on Pattern Recognition, vol. 3, Aug. 23-26, 2004, 4 pages.
Chang et al., "Real-Time Tracking with Multiple Cues by Set Theoretic Random Search", IEEE Computer Society Conference on Computer Vision and Pattern Recognition, vol. 1, Jun. 20-25, 2005, 7 pages.
Kim et al., "Integrated Approach of Multiple Face Detection for Video Surveillance", Proceedings of the 16th International Conference on Pattern Recognition, vol. 2, 2002, 4 pages.
Lee et al., "Robust Face Tracking by Integration of Two Separate Trackers: Skin Color and Facial Shape", Pattern Recognition, vol. 40, Issue 11, Nov. 2007, pp. 3225-3235.
Ahonen et al., "Face Recognition with Local Binary Patterns", In Proceedings of 8th European Conference on Computer Vision, Lecture Notes in Computer Science, vol. 3021, 2004, pp. 469-481.
Shi et al., "Symmetrical Invariant LBP Texture Descriptor and Application for Image Retrieval", Proceedings of Congress on Image and Signal Processing, vol. 2, May 27-30, 2008, pp. 825-829.
Terrillon et al., "Robust Face Detection and Japanese Sign Language Hand Posture Recognition for Human-Computer Interaction in an "Intelligent" Room", Fifteenth International Conference on Vision Interface, Dec. 31, 2002, 8 pages.
International Search Report and Written Opinion received for corresponding Patent Cooperation Treaty Application No. PCT/CN2010/000434, dated Jan. 6, 2011, 11 pages.
Office action received for corresponding Korean Patent Application No. 2012-7028743, dated Dec. 9, 2013, 4 pages, No English Language Translation available.
Office action received for corresponding Chinese Patent Application No. 201080065848.2, dated Jul. 18, 2014, 19 pages of Office Action, No English Language Translation available.
Supplementary Partial European Search Report from European Patent Application No. 10 84 8668 dated Nov. 4, 2014.
Kublbeck C et al.; "Face Detection and Tracking in Video Sequences Using the ModifiedCensus Transformation"; *Image and Vision Computing, Elsevier*, Guildford, GB; vol. 24, No. 6; Jun. 2006; pp. 564-572; XP025135456.
Jones and P Viola M: "Fast Multi-View Face Detection"; *Technical Report Mitsubishi Electric Research Laboratories*; Cambridge, MA; Jun. 2003; pp. 1-8; XP002416302.
Office Action for Chinese Application No. 201080065848.2 dated Mar. 4, 2015, 19 pages.
Extended European Search Report for corresponding European Application No. 10848668.9 dated Mar. 16, 2015, 8 pages.
Office Action for Chinese Application No. 201080065848.2 dated Sep. 6, 2015.
Jones, Michael and Viola, Paul; "Fast Multi-View Face Detection"; IEEE Conference on Computer Vision and Pattern Recognition; Jul. 2003; pp. 1-11.
Office Action for Chinese Patent Application No. 201080065848.2 dated Feb. 24, 2016.

* cited by examiner

METHODS AND APPARATUSES FOR FACE DETECTION

RELATED APPLICATION

This application was originally filed as PCT Application No. PCT/CN2010/000434 filed Apr. 2, 2010.

TECHNOLOGICAL FIELD

Embodiments of the present invention relate generally to image processing technology and, more particularly, relate to methods and apparatuses for face detection.

BACKGROUND

Face detection and tracking is becoming an increasingly more important technology. In this regard, for example, face detection may be useful in biometrics, user interface, gaming and other areas such as creating context for accessing communities in the mobile domain. Advancement in computing power of microprocessors has also made facial analysis functionality available on mobile devices, such as cell phones and other smart devices. Facial analysis may also be important going forward in relation to initiatives such as metadata standardization.

Although face detection techniques continue to improve, many current methods require either a high computation capability (e.g., statistical methods of detecting faces by scanning images in a traversing way on multiple scales) or suffer from limited face detection performance (e.g., structure-based methods with relatively high false alarms of face detection). Furthermore, some statistical face detection mechanisms have degraded performance for multi-view face detection in relation to front face detection. As another complicating issue, faces encountered in a particular image may not always be oriented in the same direction relative to the camera, which could negatively impact face detection. For example, in-plane rotation (e.g., faces that are rotated along the axis from the face to the observer) may complicate face detection in some cases.

Accordingly, the tendency for developing devices with continued increases in their capacity to create content, store content and/or receive content relatively quickly upon request, the trend toward electronic devices (e.g., mobile electronic devices such as mobile phones) becoming increasingly ubiquitous in the modern world, and the drive for continued improvements in interface and access mechanisms to unlock the capabilities of such devices, may make it desirable to provide further improvements in the area of face detection.

BRIEF SUMMARY

Methods, apparatuses, and computer program products are herein provided for face detection. Systems, methods, apparatuses, and computer program products in accordance with various embodiments may provide several advantages to computing devices and computing device users. Example embodiments provide for multi-view face detection and tracking in real time or in near real time in a manner that may be computationally less taxing than previous face tracking methods. Some example embodiments provide a one-frame-one-view detection scheme wherein a subset of face detection parameters is used for face detection in a particular frame. In this regard, performing face detection with the subset of face detection parameters may be computationally less taxing than performing face detection with an entire set of face detection parameters. Further, some such example embodiments iteratively rotate usage of subsets of face detection parameters in a sequence of video frames. Therefore, if a face is not detected with a parameter subset used in a video frame, it may be detected with a parameter subset used in a subsequent video frame. Accordingly, such embodiments may reduce computational complexity required for performing face detection in a given frame while still providing for at least substantially real time face tracking given a sufficient video frame rate.

Some example embodiments may further reduce computational complexity for face tracking by performing face detection in a portion of a frame determined based at least in part upon a position at which a face was detected in a preceding frame. For example, some example embodiments utilize a spiral grid scanning pattern to scan in an expanding spiral grid originating at a position at which a face was detected in a preceding frame. Accordingly, as face position may not vary greatly from frame to frame, scanning time and computational resources required for scanning a frame may be reduced based on a priori knowledge of a position of a face in a preceding frame.

Some example embodiments may further reduce computational complexity by estimating an image posture of an image patch prior to performing face detection in the image patch. These example embodiments utilize the estimated image posture to narrow down a set of face posture models used to perform face detection in the image patch. Accordingly, computational requirements for performing face detection within the image patch may be reduced by reducing the number of posture models used for the image patch based on the estimated image posture.

In a first example embodiment, a method is provided, which comprises selecting a face detection parameter subset from a plurality of face detection parameter subsets. Each face detection parameter subset of this embodiment comprises a subset of face posture models from a set of face posture models and a subset of image patch scales from a set of image patch scales. The method of this embodiment further comprises using the selected face detection parameter subset for performing face detection in an image.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least select a face detection parameter subset from a plurality of face detection parameter subsets. Each face detection parameter subset of this embodiment comprises a subset of face posture models from a set of face posture models and a subset of image patch scales from a set of image patch scales. The at least one memory and stored computer program code are configured, with the at least one processor, to further cause the apparatus of this embodiment to use the selected face detection parameter subset for performing face detection in an image.

In another example embodiment, a computer program product is provided. The computer program product of this embodiment includes at least one computer-readable storage medium having computer-readable program instructions stored therein. The program instructions of this embodiment comprise program instructions configured to select a face detection parameter subset from a plurality of face detection parameter subsets. Each face detection parameter subset of this embodiment comprises a subset of face posture models from a set of face posture models and a subset of image patch scales from a set of image patch scales. The program instructions of this embodiment further comprise program instructions configured to use the selected face detection parameter subset for performing face detection in an image.

In another example embodiment, a computer-readable storage medium carrying computer-readable program instructions is provided. The program instructions of this embodiment comprise program instructions configured to select a face detection parameter subset from a plurality of face detection parameter subsets. Each face detection parameter subset of this embodiment comprises a subset of face posture models from a set of face posture models and a subset of image patch scales from a set of image patch scales. The program instructions of this embodiment further comprise program instructions configured to use the selected face detection parameter subset for performing face detection in an image.

In another example embodiment, an apparatus is provided that comprises means for selecting a face detection parameter subset from a plurality of face detection parameter subsets. Each face detection parameter subset of this embodiment comprises a subset of face posture models from a set of face posture models and a subset of image patch scales from a set of image patch scales. The apparatus of this embodiment further comprises means for using the selected face detection parameter subset for performing face detection in an image.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
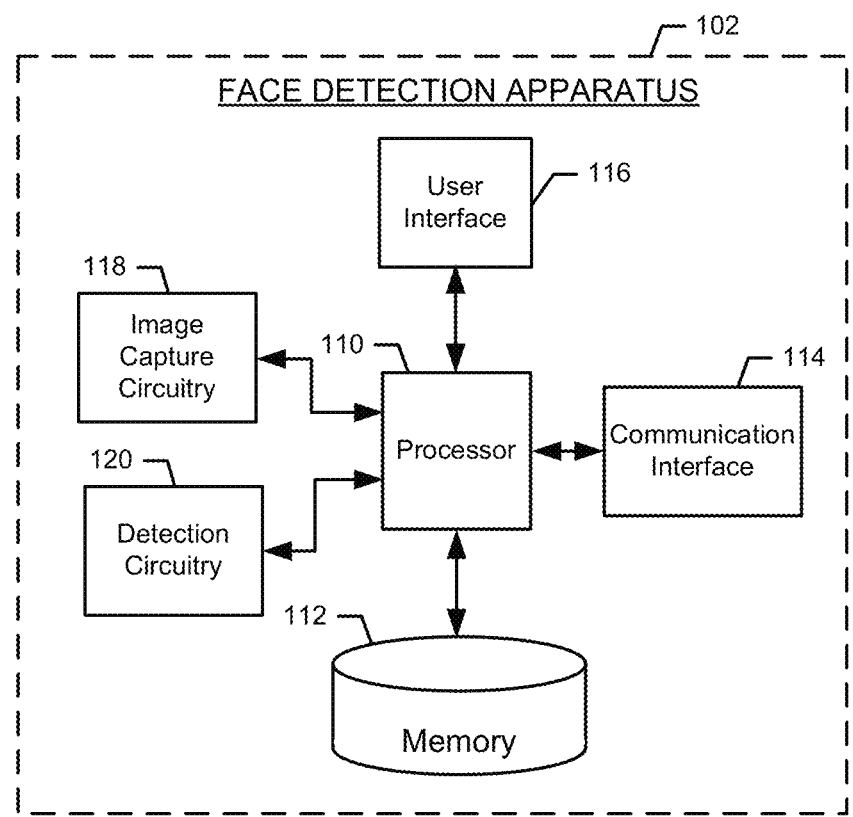
FIG. 1 illustrates a block diagram of a face detection apparatus for performing face detection according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Multiple views (including different scales and multiple postures) are one of the key issues that must be considered when implementing face-based applications. Face tracking may be conducted by detecting faces in the global or local regions of an input image sequence. Boosting based statistic face tracking, which scans the input images with a predefined sliding window and models, is one method used for face detection and tracking. However, existing boosting based statistic face tracking methods may have an undesirable degree of computational complexity. Accordingly, embodiments of the invention, some of which are discussed herein, provide for improved face detection and tracking.

FIG. 1 illustrates a block diagram of a face detection apparatus 102 for performing face detection according to an example embodiment of the present invention. It will be appreciated that the face detection apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing face detection other configurations may also be used to implement embodiments of the present invention.

The face detection apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the face detection apparatus 102 is embodied as a mobile terminal, such as that illustrated in FIG. 2.

Figure 2:
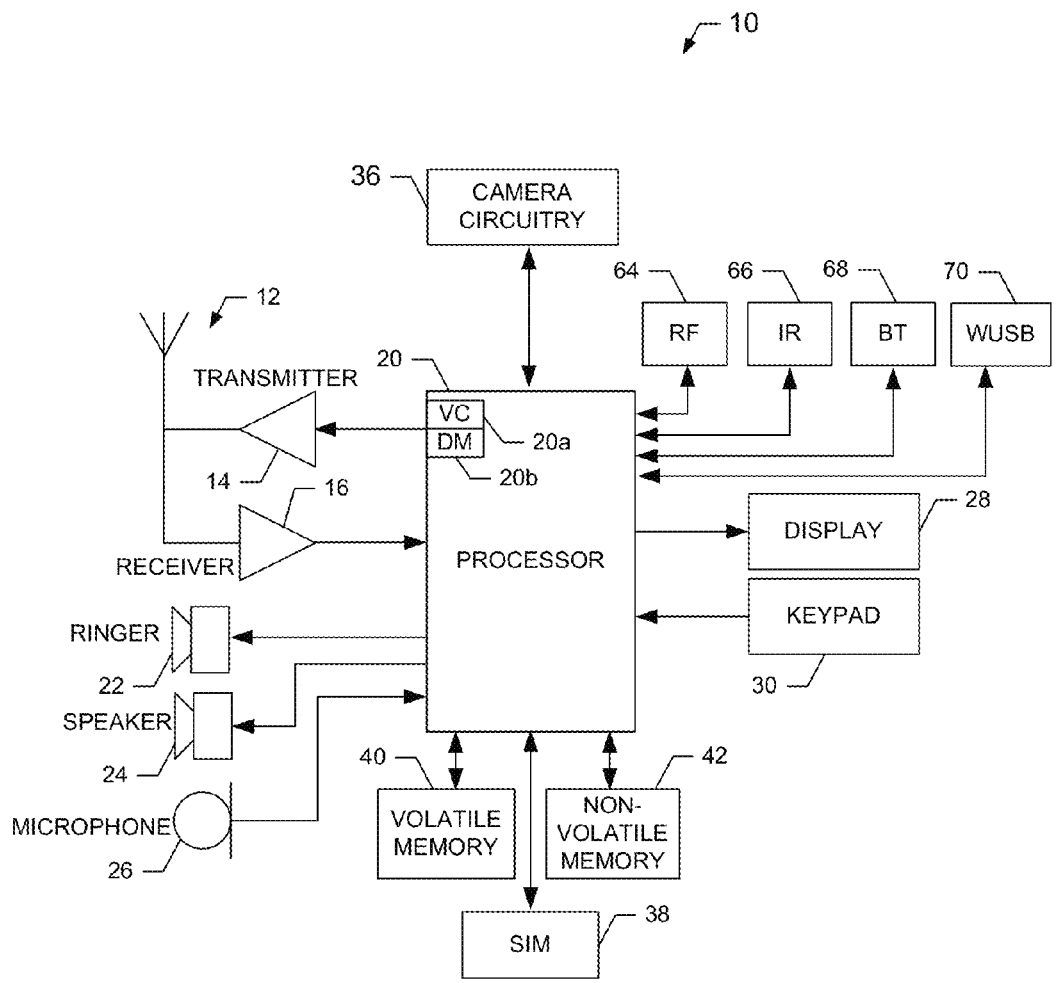
FIG. 2 is a schematic block diagram of a mobile terminal according to an example embodiment of the present invention.

In this regard, FIG. 2 illustrates a block diagram of a mobile terminal 10 representative of one embodiment of a face detection apparatus 102. It should be understood, however, that the mobile terminal 10 illustrated and hereinafter described is merely illustrative of one type of face detection apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data.

For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may include a media capturing element, such as a camera, video and/or audio module, in communication with the processor 20. The media capturing element may comprise any means for capturing an image, video and/or audio for storage, display or transmission. For example, in an example embodiment in which the media capturing element comprises camera circuitry 36, the camera circuitry 36 may include a digital camera configured to form a digital image file from a captured image. In addition, the digital camera of the camera circuitry 36 may be configured to capture a video clip. As such, the camera circuitry 36 may include all hardware, such as a lens or other optical component(s), and software necessary for creating a digital image file from a captured image as well as a digital video file from a captured video clip. Alternatively, the camera circuitry 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera circuitry 36 may be displayed on the display 28 of the mobile terminal 10 to illustrate a view of an image currently displayed which may be captured if desired by the user. As such, a captured image may, for example, comprise an image captured by the camera circuitry 36 and stored in an image file. As another example, a captured image may comprise an object or objects currently displayed by a display or viewfinder of the mobile terminal 10, but not necessarily stored in an image file. In an example embodiment, the camera circuitry 36 may further include a processing element such as a co-processor configured to assist the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the face detection apparatus 102 includes various means for performing the various functions herein described. These means may comprise one or more of a processor 110, memory 112, communication interface 114, user interface 116, image capture circuitry 118, or detection circuitry 120. The means of the face detection apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the face detection apparatus 102 as described herein. The plurality of processors may be embodied on a single computing device or distributed across a plurality of computing devices collectively configured to function as the face detection apparatus 102. In embodiments wherein the face detection apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the face detection apparatus 102 to perform one or more of the functionalities of the face detection apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the face detection apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the face detection apparatus 102 is embodied as a mobile terminal 10, the memory 112 may comprise the volatile memory 40 and/or the non-volatile memory 42. The memory 112 may be configured to store information, data, applications, instructions, or the like for enabling the face detection apparatus 102 to carry out various functions in accordance with various example embodiments. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, models used for face detection, images, videos, video frames, and/or the like. This stored information may be stored and/or used by the image capture circuitry 118 and/or detection circuitry 120 during the course of performing their functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. For example, the communication interface 114 may be configured to receive data representing an image or video over a network. In this regard, in embodiments wherein the face detection apparatus 102 comprises a server, network node, or the like, the communication interface 114 may be configured to communicate with a remote user terminal (e.g., the user terminal 304) to allow the user terminal and/or a user thereof to access face detection functionality provided by the face detection apparatus 102. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the face detection apparatus 102 and one or more computing devices are in communication. The communication interface 114 may additionally be in communication with the memory 112, user interface 116, image capture circuitry 118, and/or detection circuitry 120, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the face detection apparatus 102 is embodied as one or more servers, aspects of the user interface 116 may be reduced or the user interface 116 may even be eliminated. The user interface 116 may be in communication with the memory 112, communication interface 114, image capture circuitry 118, and/or detection circuitry 120, such as via a bus.

The image capture circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the image capture circuitry 118 is embodied separately from the processor 110, the image capture circuitry 118 may be in communication with the processor 110. The image capture circuitry 118 may further be in communication with one or more of the memory 112, communication interface 114, user interface 116, or detection circuitry 120, such as via a bus.

The image capture circuitry 118 may comprise hardware configured to capture an image and/or video. In this regard, the image capture circuitry 118 may comprise a camera lens and/or other optical components for capturing a digital image. As another example, the image capture circuitry 118 may comprise circuitry, hardware, a computer program product, or some combination thereof that is configured to direct the capture of an image by a separate camera module embodied on or otherwise operatively connected to the face detection apparatus 102. In embodiments wherein the face detection apparatus 102 is embodied as a mobile terminal 10, the image capture circuitry 118 may comprise the camera circuitry 36. In embodiments wherein the face detection apparatus 102 is embodied as one or more servers or other network nodes remote from a user terminal configured to provide an image or video to the face detection apparatus 102 to enable the face detection apparatus 102 to perform face detection on the image or video, aspects of the image capture circuitry 118 may be reduced or the image capture circuitry 118 may even be eliminated.

The detection circuitry 120 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the detection circuitry 120 is embodied separately from the processor 110, the detection circuitry 120 may be in communication with the processor 110. The detection circuitry 120 may further be in communication with one or more of the memory 112, communication interface 114, user interface 116, or image capture circuitry 118, such as via a bus.

Figure 3:
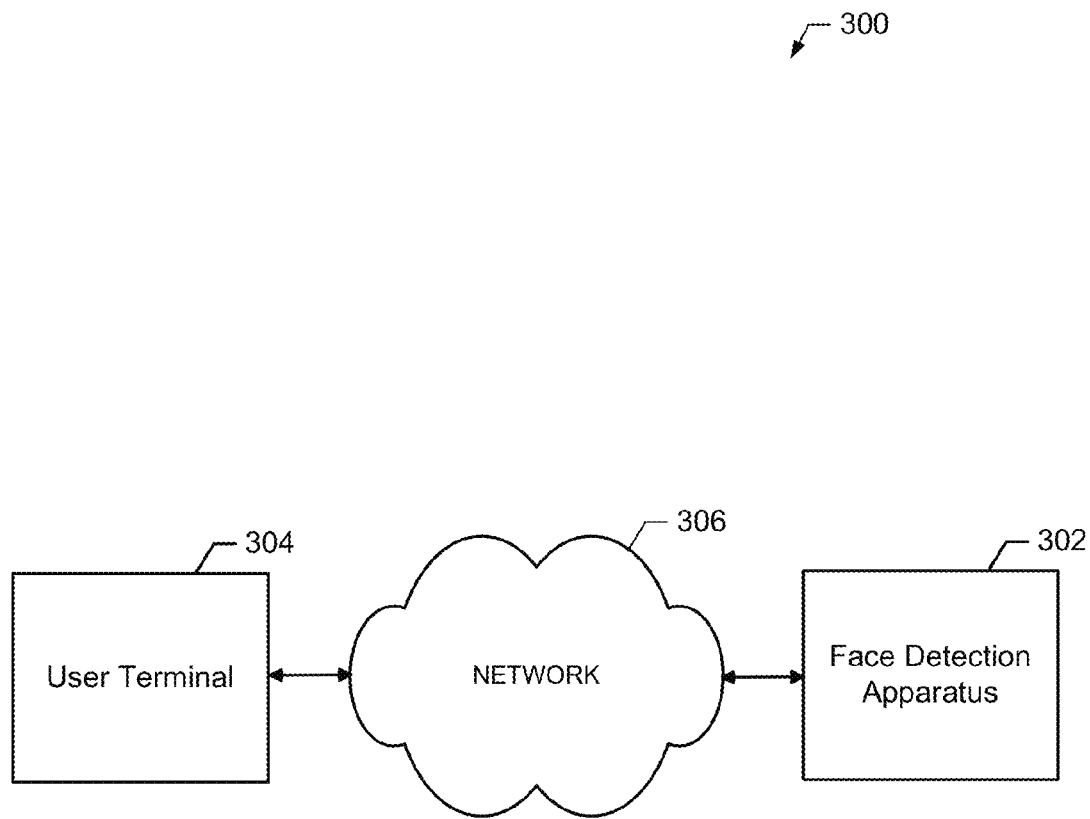
FIG. 3 illustrates a system for performing face detection according to an example embodiment of the invention.

FIG. 3 illustrates a system 300 for performing face detection according to an example embodiment of the invention. The system 300 comprises a face detection apparatus 302 and a user terminal 304 configured to communicate over the network 306. The face detection apparatus 302 may, for example, comprise an embodiment of the face detection apparatus 102 wherein the face detection apparatus 102 is embodied as one or more servers, one or more network nodes, or the like that is configured to provide face detection services to a remote user terminal and/or user thereof. The user terminal 304 may comprise any computing device configured to access the network 306 and communicate with the face detection apparatus 302 in order to access face detection services provided by the face detection apparatus 302. The user terminal 304 may, for example, be embodied as a desktop computer, laptop computer, mobile terminal, mobile computer, mobile phone, mobile communication device, mobile terminal 10, game device, digital camera/camcorder, audio/video player, television device, radio receiver, digital video recorder, positioning device, any combination thereof, and/or the like. The network 306 may comprise a wireline network, wireless network (e.g., a cellular network, wireless local area network, wireless wide area network, some combination thereof, or the like), or a combination thereof, and in one embodiment comprises the internet.

In the example system illustrated in FIG. 3, the face detection apparatus 302 may be configured to receive an image, video clip, video frame, and/or the like sent by the user terminal 304. The face detection apparatus 302 (e.g., detection circuitry 120) may be configured to perform face detection on the received image, video clip, and/or video frame in accordance with any of the embodiments described herein below with respect to the face detection apparatus 102. The face detection apparatus 302 (e.g., detection circuitry 120 and/or communication interface 114) may be further configured to send results of face detection and/or face tracking performed by the face detection apparatus 302 to the user terminal 304.

In another example embodiment of the system 300, aspects of the detection circuitry 120 may be distributed between the user terminal 304 and face detection apparatus 302. In this example embodiment, the face detection apparatus 302 may handle some of the processing tasks required for performing face detection. In this regard, the user terminal 304 may not be required to perform more computationally-intensive steps for performing face detection.

Figure 4:
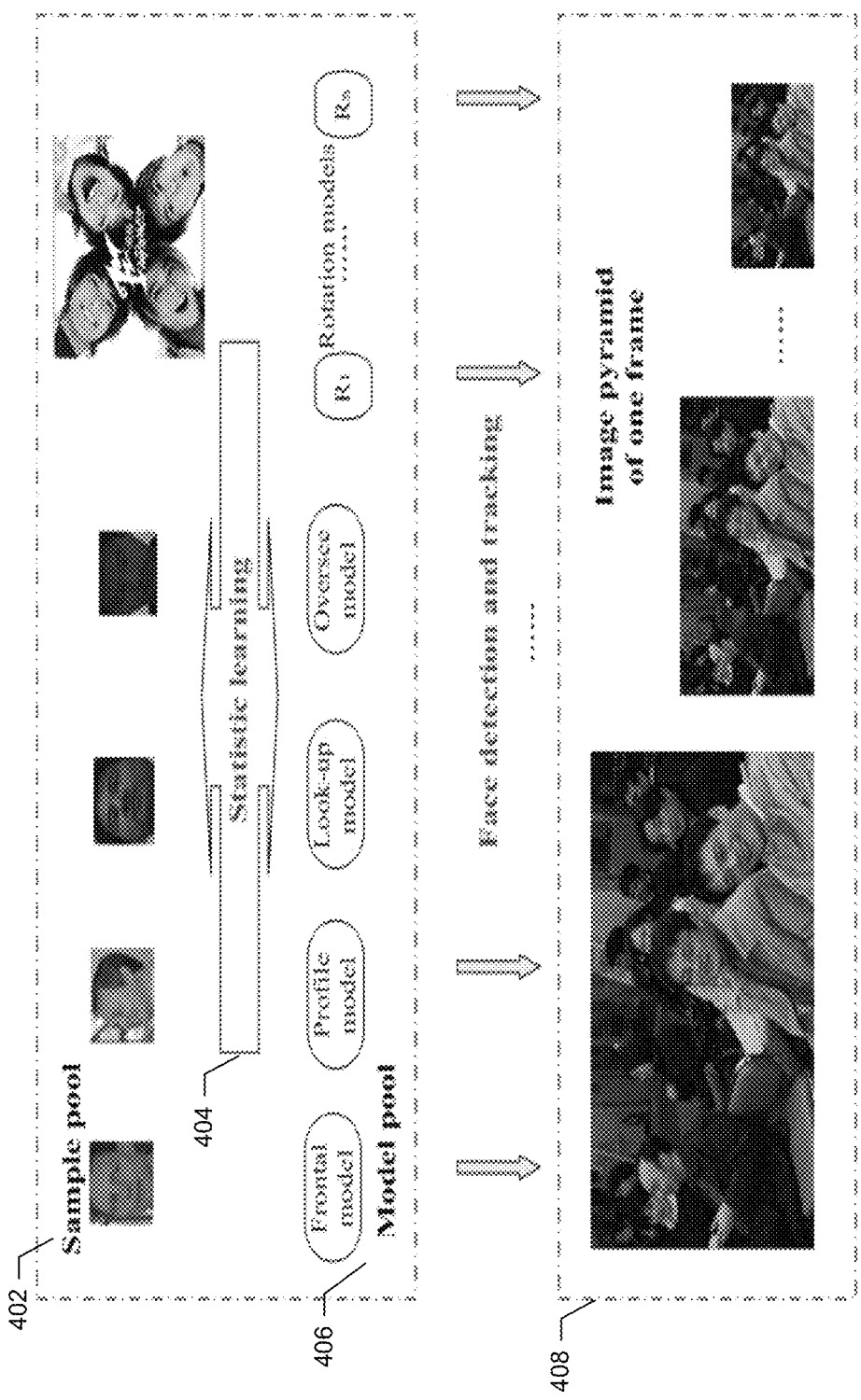
FIG. 4 illustrates a diagram according to an example method for statistic face detection and tracking.

FIG. 4 illustrates a diagram according to an example method for statistic-based face detection and tracking. In this regard, several classifiers may be trained using a pool of face samples 402. Each of the face samples may have a predefined size, such as, 20×20. The face samples may be used to train the classifiers through a statistic learning process 404. Any appropriate statistical-based training method may be used to train the classifiers. One example statistical-based training method that may be used for training the classifiers is Adaboost (adaptive boosting). Other examples of statistical-based training methods may include Gentle-Boost, Real-Boost, FloatBoost, and/or the like.

In order to facilitate the statistic learning process, the sample pool 402 may be divided into a series of groups according to the views or postures (e.g. frontal faces, profile faces, look-up faces, and oversee faces), and each classifier may be trained for each group to achieve high classification rate. In this regard, each classifier may be trained using a plurality of face samples having one or more of a particular view or posture to detect a face within an image patch having one or more of the particular view or posture. These classifiers are referred to as models hereinafter since they focus on different views or postures. Accordingly, statistic learning process 404 may result in a model pool 406 having a plurality of models, each of which may be directed to a particular view or posture. Example models illustrated in FIG. 4 include a frontal model, profile model, look-up model, and oversee model. In addition, there may be a plurality of rotation models trained to detect faces having various rotational orientations within a rotation plane.

The model pool 406 may be used for performing face detection in an image. One method that may be used for performing face detection is use of a sliding window to scan the image. The sliding window may have a predefined size, such as 20×20, which may be the same size as the face samples used to train the model pool 406. Since the models are trained with face samples having a predefined size, the scanning and matching process used for performing face detection may be repeated several times by down-sampling the input image until a maximum face size is reached. In this regard, a plurality of scales may be used during the face detection process. FIG. 4 illustrates a series of scales 408 of an input image. This series of scales is referred to as an "image pyramid."

Existing face detection processes may use all models in the model pool in each window position for performing face detection in an image. This approach is referred to as a one-frame-all-view scheme. This repeated matching between all of the models and the windows using the image pyramid may be quite computationally expensive and may be extremely time-consuming Suppose M scales and N models are employed, the overall computation is approximately estimated as proportional to MN. Thus, the time consumption may be estimated as T=αMN, where α is a constant. Accordingly, large M and N will slow down the tracking process (frame per second, fps). In some experiments, T has been estimated to be about one second per frame for a Quarter Video Graphics Array image. One second per frame may be too long for real-time face tracking applications. However, choosing a small M and N will inevitably miss faces because face views are not fully covered. Therefore, it is a challenging and urgent task to find a more effective face tracking scheme, especially for mobile devices. Example embodiments provide several techniques that may address this challenge.

In some example embodiments, the detection circuitry 120 is configured to implement a one-frame-one-view detection scheme, which may address the challenge to provide an effective face tracking scheme. Face detection may utilize two parameter categories: models and scales (e.g., scale sizes used to scale image patches). In an example embodiment of the one-frame-one-view detection scheme, the set of models and scale parameters used for face detection by the detection circuitry 120 are grouped into a plurality of face detection parameter subsets. In this regard, the set of face posture models in the model pool may be grouped into a plurality of model subsets. The face posture models may be grouped based on any appropriate criteria. An example criterion is computational complexity, which may be used to group face posture models such that each model subset may have a substantially equal computational complexity. Similarly, the set of image patch scales used in the image pyramid may be grouped into a plurality of scale subsets. The image patch scales may also be grouped based on any criteria, including computational complexity such that each scale subset has a substantially equal computational complexity. Each face detection parameter subset may comprise a model subset and a scale subset.

Figure 5:
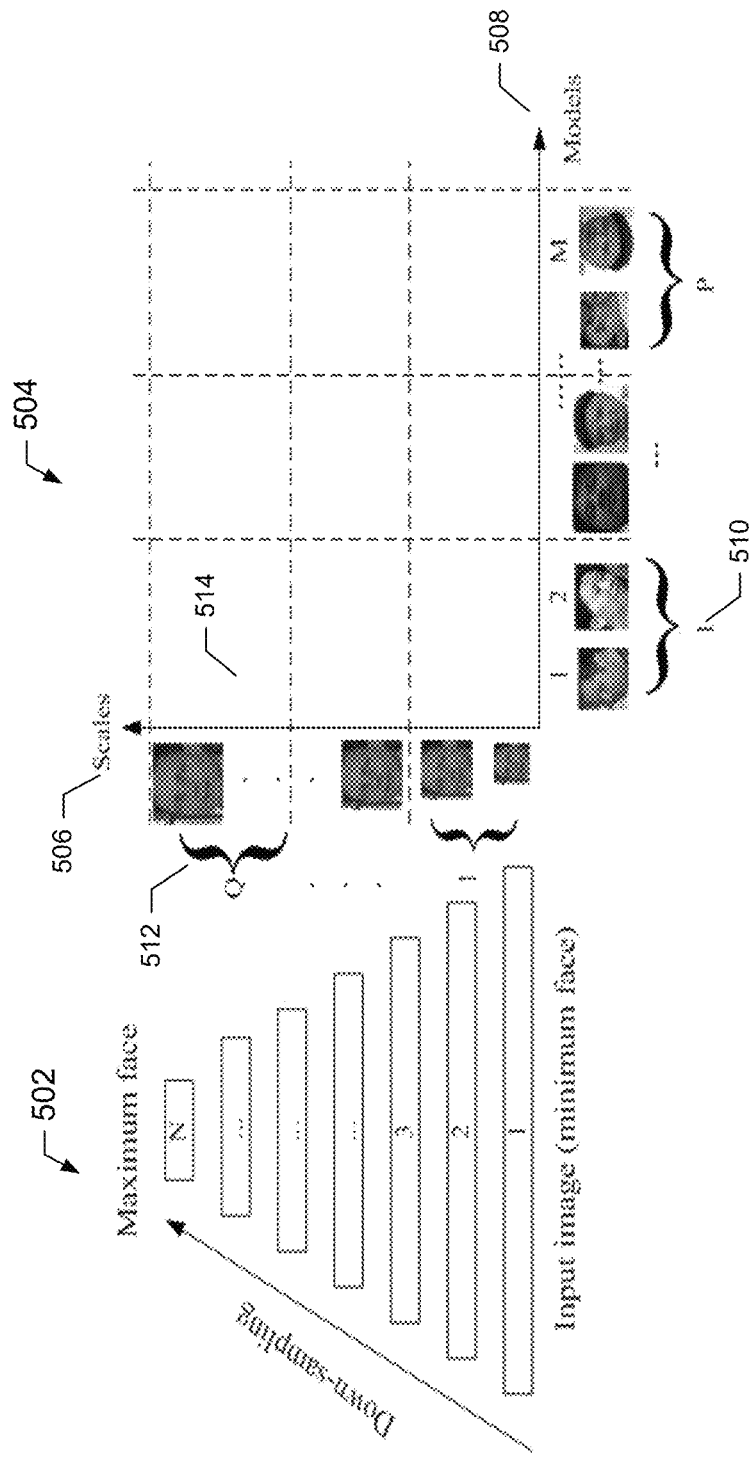
FIG. 5 illustrates division of a set of face detection parameters into a plurality of face detection parameter subsets according to an example embodiment of the invention.

FIG. 5 illustrates division of a set of face detection parameters into a plurality of face detection parameter subsets according to an example embodiment of the invention. The image pyramid 502 illustrates a series of image patch scales that may be used to down-sample (e.g., scale) an image patch. The graph 504 illustrates an example in which the whole model set and scale set have been uniformly partitioned into several subsets (e.g. P subsets 508 for models and Q subsets 506 for scales). The subsets may, for example, be partitioned such that every subset has nearly the same computational complexity. Each grid in the graph 504 corresponds with a different face detection parameter subset. Accordingly, the face detection parameter subset 514 may be comprised of the model subset 510 and the scale subset 512.

In an example embodiment, the detection circuitry 120 is configured to select a face detection parameter subset and use the selected face detection parameter subset for performing face detection in an image, rather than using the entire set of face detection parameters. In this regard, use of a face detection parameter subset may exploit the existence of a face in a series of consecutive frames. Accordingly, the detection circuitry 120 may allocate partial and complementary parameters to different frames in a sequence of video frames. Thus, for a given frame, if only one grid in the graph 504 is selected for face detection, the time consumption for face detection in the frame becomes 1/pQ, which is PQ times the speed of the one-frame-all-view approach. As only a subset of the face detection parameters are used for a frame, it is possible that a face depicted in a frame may not be detected. However, since the face will almost certainly be present in at least the next few ensuing frames and different face detection parameter subsets may be used for the ensuing frames, the face may be detected in at least one of the ensuing frames by the detection circuitry 120. Accordingly, there may not be any obvious halt during face tracking because a new frame may arrive in a video frame sequence soon after each face detection parameter subset is selected. Further, the detection circuitry 120 may provide smooth face tracking, as the parameter partition may be substantially computationally uniform.

The detection circuitry 120 may receive or otherwise access an image and/or video in which face detection is to be performed. The accessed image or video may, for example, be captured by the image capture circuitry 118. An image may comprise a still image or a video frame. For purposes of this description, "image" is used to refer interchangeably to a still image as well as a video frame unless otherwise indicated. The detection circuitry 120 may select a face detection parameter subset to use for performing face detection in an accessed image. In an example embodiment, the detection circuitry 120 may iteratively assign a face detection parameter subset from the pool of face detection parameter subsets (e.g., a grid from the grids of the graph 504) to each video frame in a sequence of video frames. Accordingly, the face detection parameter subset used for face detection may be iteratively rotated to allow for detection and tracking of a face within a video frame sequence.

Figure 6:
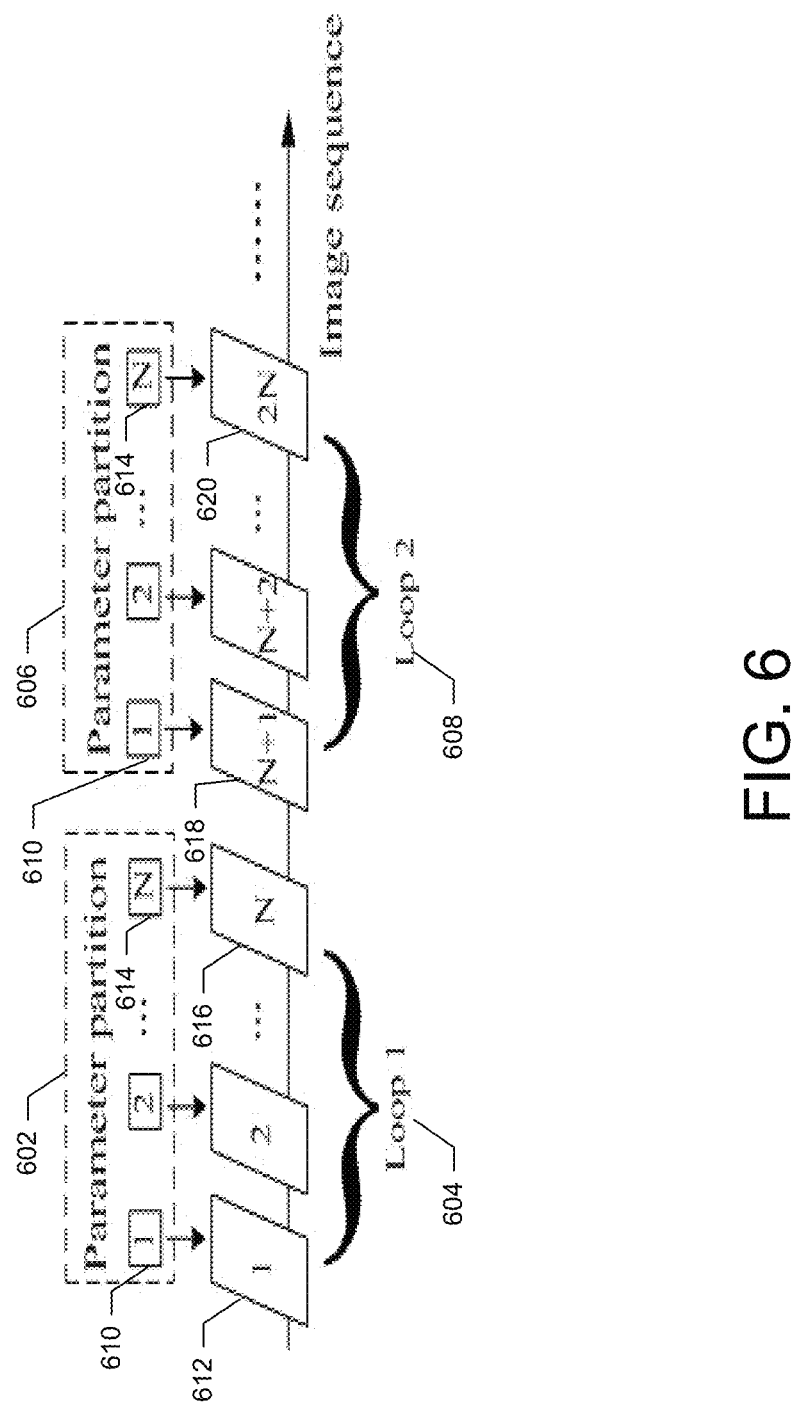
FIG. 6 illustrates iterative assignment of face detection parameter subsets to a video frame sequence according to an example embodiment of the invention.

FIG. 6 illustrates iterative assignment of face detection parameter subsets to a video frame sequence according to an example embodiment of the invention. In this regard, FIG. 6 illustrates iterative assignment of N face detection parameter subsets to an image frame sequence. In FIG. 6, there are two full parameter partitions illustrated: parameter partition 602 and parameter partition 606. The N face detection parameter subsets are assigned in the parameter partition 602 to the N video frames comprising the loop 604. The N face detection parameter subsets are also assigned in the parameter partition 606 to the N video frames comprising the loop 608. Accordingly, when the N face detection parameter subsets have been completely cycled through after a sequence of N video frames, iterative allocation and selection of a face detection parameter subset may begin again with face detection parameter subset 1 at video frame N+1. Looking more closely at a couple example iterative assignments, the first face detection parameter subset 610 is assigned to the first video frame 612. The Nth face detection parameter subset 614 is assigned to the Nth video frame 616. The first face detection parameter subset 610 is also assigned to the Nth+1 video frame 618. The Nth face detection parameter subset 614 is additionally assigned to the 2Nth video frame 620.

Accordingly, the detection circuitry 120 may be configured to select a face detection parameter subset for use in face detection for a video frame by selecting the face detection parameter subset that has been iteratively assigned to the video frame. When performing face detection in a video frame, the detection circuitry 120 may be configured to additionally or alternatively select a face detection parameter subset for use in face detection for the video frame based at least in part on a face detection parameter subset used to detect a face in a preceding video frame. Thus, for example, if a particular face detection parameter subset successfully detected a face in the Nth video frame, then it may be known that the particular face detection parameter subset includes a model(s) and/or scale(s) that may successfully detect the same face in the Nth+1 video frame. Accordingly, the detection circuitry 120 may be configured to select the same face detection parameter subset for the Nth+1 video frame as was used for the Nth video frame when a face was detected in the Nth video frame.

The detection circuitry 120 may be configured to use a selected face detection parameter subset for performing face detection in an image by scanning at least a portion of the image using a sliding window. The sliding window may have a predefined size, which may be equivalent to a size of the face samples used to train the models. The detection circuitry 120 may be configured to extract an image patch from each position of the sliding window in the scanned portion of the image. The detection circuitry 120 may use the selected face detection parameter subset for performing face detection in each image patch.

The detection circuitry 120 may scan an image using any scanning pattern. As one example, the detection circuitry 120 may scan an image in a left-to-right, top-to-bottom pattern. As another example, the detection circuitry 120 may scan an image in a top-to-bottom, left-to-right pattern. It will be appreciated, however, that these patterns are provided merely by way of example. Accordingly, use of scanning patterns that are reversed from the examples provided as well as other scanning patterns is contemplated within the scope of the invention. When scanning a first video frame in a sequence of video frame or when scanning a video frame following a predefined number of preceding video frames in which no face has been detected, the detection circuitry 120 may be configured to scan the entire image beginning with a predefined initial window position (e.g., the top left window position).

In some embodiments, the detection circuitry 120 may be configured to use a priori knowledge of a position of a previously detected face to determine a portion of an image to scan and/or a starting position for scanning the image. Thus, for example, if the detection circuitry 120 detects a face at a particular position in the Nth video frame in a sequence of video frames, the detection circuitry 120 may be configured to scan an area of the Nth+1 video frame having a center point defined by the position of the face detected in the Nth video frame and bound by borders being a predefined distance from the position center point. The detection circuitry 120 may additionally or alternatively be configured to select the position of the face detected in the Nth video frame as the scanning starting position in the Nth+1 video frame.

In an example embodiment the detection circuitry 120 is configured to scan at least a portion of a video frame using a sliding window in a spiral grid pattern having a scanning starting position determined based on a position of a face detected in a preceding video frame. In this regard, the detection circuitry 120 may scan a video frame in an expanding spiral grid pattern having a point of origin at the position at which a face was detected in a previous frame. The spiral grid search pattern may be performed through iterative switch between vertical and horizontal scanning directions. Accordingly, scanning may focus on an area central to the position of the face in the previous frame.

Figure 7:
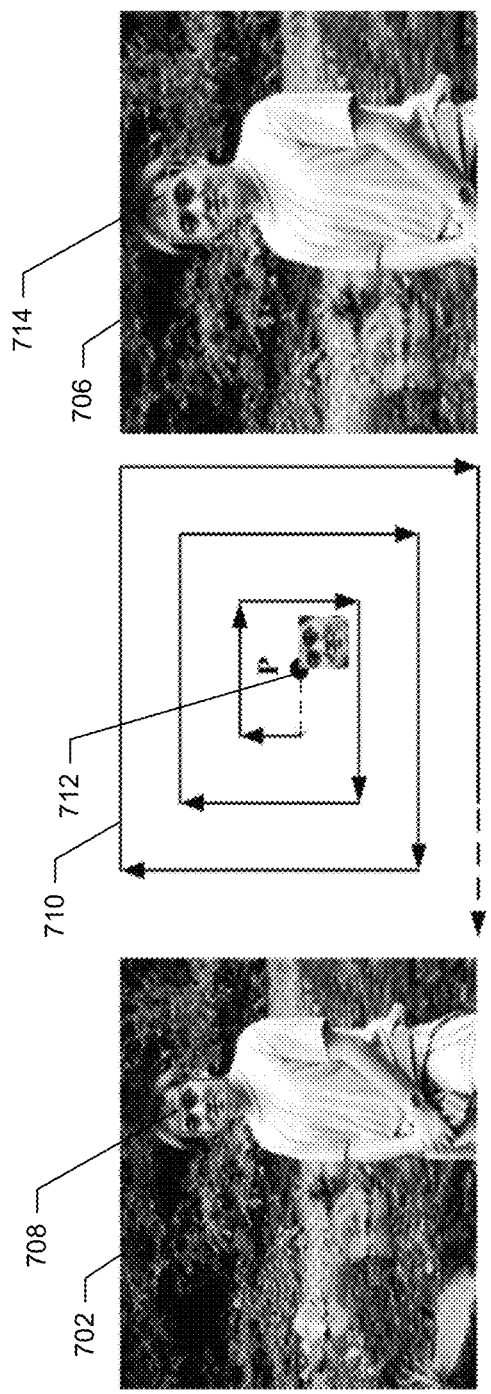
FIG. 7 illustrates spiral grid scanning according to an example embodiment of the invention.

FIG. 7 illustrates spiral grid scanning according to an example embodiment of the invention. FIG. 7 illustrates a first video frame 702 and a second video frame 706. A face was detected at position 708 in the first video frame. Accordingly, the detection circuitry 120 may scan the second video frame 706 using the spiral grid scanning pattern 710 having a scanning starting position at the point 712, corresponding to the position 708 at which the face was detected in the first video frame 702. Using the spiral grid scanning pattern 710, the detection circuitry 120 may detect the face at position 714 in the second video frame 706.

In some example embodiments, the detection circuitry 120 is configured to implement face posture estimation to reduce a number of face posture models used for face detection in a particular image patch. In this regard, given a face detection parameter subset selected for performing face detection in an image, the detection circuitry 120 may be configured to estimate a posture of an image patch extracted from the image. The detection circuitry 120 may compare the estimated posture to the postures of the face posture models in the face detection parameter subset and determine the face posture models (if any) within the face detection parameter subset that are applicable to the estimated pose. The detection circuitry 120 may then use only those face posture models (if any) determined to be applicable to the estimated pose for performing face detection in the image patch. Since the computational complexity of performing pose estimation may be less than for matching a model to an image patch, use of pose estimation may reduce computational complexity and improve the speed of face detection.

Figure 8:
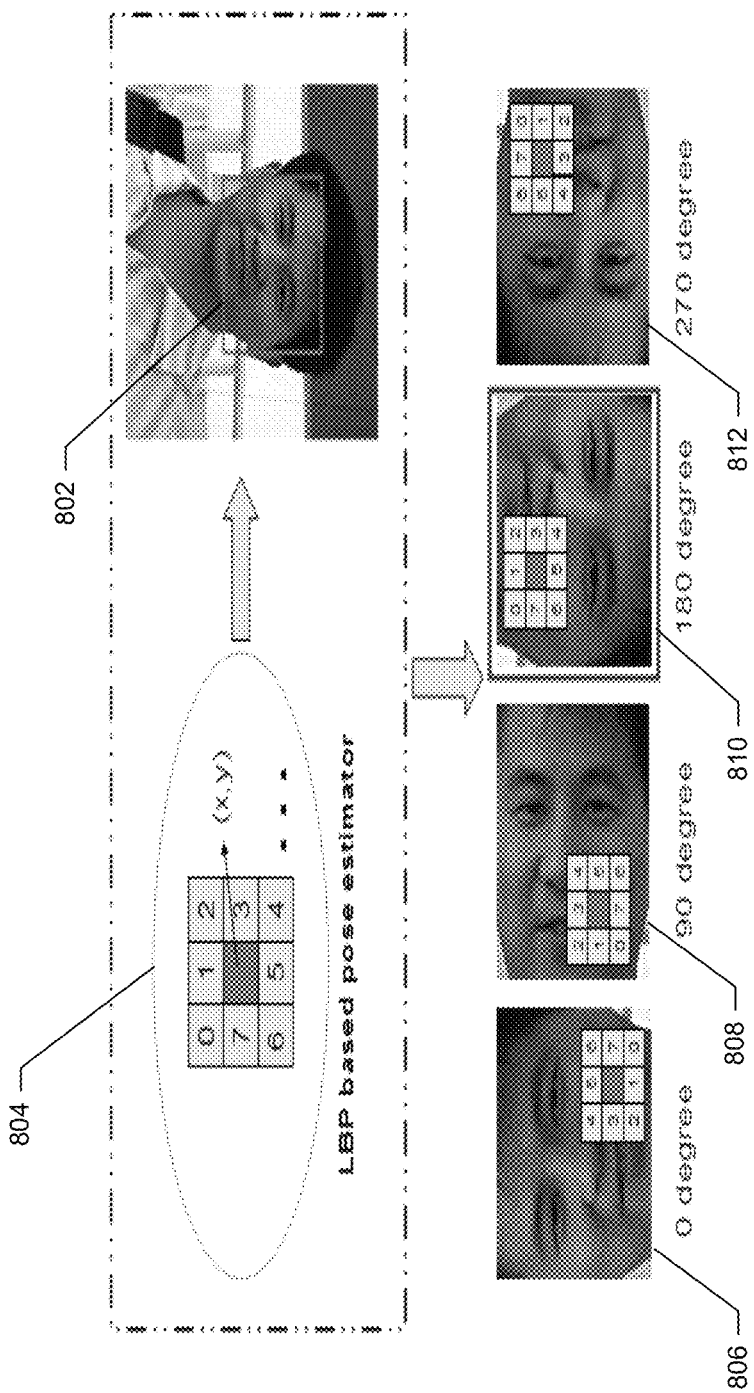
FIG. 8 illustrates posture estimation according to an example embodiment of the invention.

In an example embodiment, the detection circuitry 120 is configured to implement a local binary pattern (LBP) based facial posture estimation to allow for efficient tracking of faces with in-plane rotations. FIG. 8 illustrates posture estimation according to an example embodiment using LBP based posture estimation. As shown in FIG. 8, given an image patch I 802 and LBP feature pool P={$(x_0,y_0,f_0,[256]),(x_1,y_1,f_1,[256]), \ldots$}, the posture of I can be predicted by rotating features and computing corresponding confidence scores using the LBP based pose estimator 804. P may be composed of some weak classifiers in a trained LBP based face detector, in which x and y are feature positions and f[256] is the multi branches tree classifier with 256 sub-nodes. For example, if the LBP value of $(x_0,y_0)$ in I is b, where b∈[0,255], then the confidence score that the patch is a face will be $f_0[b]$.

Performance of posture estimation may comprise performing feature position mapping. In this regard, the features in P may be obtained from vertical face training data. Accordingly to detect faces with rotations (e.g., of 0, 90, 180 and 270 degree), all features in P have to be spatially mapped. The feature position $(x_0,y_0)$ may be mapped to $(x_0,h-y_0)$, $(h-y_0, w-x_0)$ and $(w-x_0,y_0)$ corresponding to 90, 180, 270 degree, respectively, where h and w are image height and width.

Performance of posture estimation may further comprise performing feature value mapping. Computation of an LBP feature may be used to compare the central pixel value and its surrounding values. After feature position mapping, the spatial rank order (e.g., from 0~7) may be rearranged as well. The spatial rank order may take different forms by bit shift operation, as illustrated in FIG. 8 by the 0 degree rotation image patch 806, 90 degree rotation image patch 808, 180 degree rotation image patch 810, and 270 degree rotation image patch 812.

Performance of posture estimation may additionally comprise determining a confidence score for each potential rotation range in a rotation plane. In this regard, a 360 degree rotation plane may be divided into a plurality of rotation ranges or sectors. The rotation ranges may comprise any size slice of the rotation plane. In the example illustrated in FIG. 8, the rotation plane is divided into four 90 degree rotation ranges. Thus in the example of FIG. 8, the posture of an image patch may be one of the four rotations ranges, each covering 90 degree in the rotation plane. Every feature in P may contribute a number of confidence scores equal to the number of rotation ranges into which the rotation plane is divided. Thus in the example of FIG. 8, every feature in P contributes four confidence scores $f[b_i]$, where i=0~3 and $b_i$ is the LBP value at the mapped feature position. If only one feature is used for posture estimation, the largest value of $f[b_i]$ determines the estimated posture of the image patch. With sum fusion rules, usage of more features will result in more precise posture estimation.

Usage of posture estimation in face tracking may provide several advantages. In this regard, usage of posture estimation may avoid exhaustive image rotation operations to track face with multiple postures. Accordingly, tracking efficiency may be improved. LBP features may be used to model rich facial textures and may be computed relatively quickly. LBP posture estimation may thus even be implemented on platforms having limited processing capabilities, such as some mobile computing platforms. Further, where LBP based posture estimation is used, the detection circuitry 120 may be configured to implement the posture estimator as part of a LBP based face detector, so the training of an individual posture estimator may be unnecessary. The LBP based multi-branch tree may be used to effectively code all kinds of local facial patterns. Accordingly, by using this tree classifier, the detection circuitry 120 may be configured to precisely estimate postures by only using few (e.g., 5) features.

Figure 9:
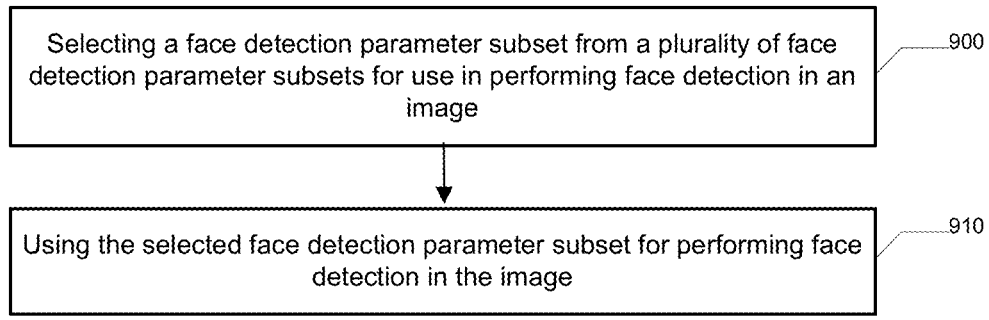
FIG. 9 illustrates a flowchart according to an example method for performing face detection according to an example embodiment of the invention.

FIG. 9 illustrates a flowchart according to an example method for performing face detection according to an example embodiment of the invention. The operations illustrated in and described with respect to FIG. 9 may, for example, be performed by, with the assistance of, and/or under the control of one or more of the processor 110, memory 112, communication interface 114, user interface 116, image capture circuitry, or detection circuitry 120. Operation 900 may comprise selecting a face detection parameter subset from a plurality of face detection parameter subsets for use in performing face detection in an image. Operation 910 may comprise using the selected face detection parameter subset for performing face detection in the image.

Figure 10:
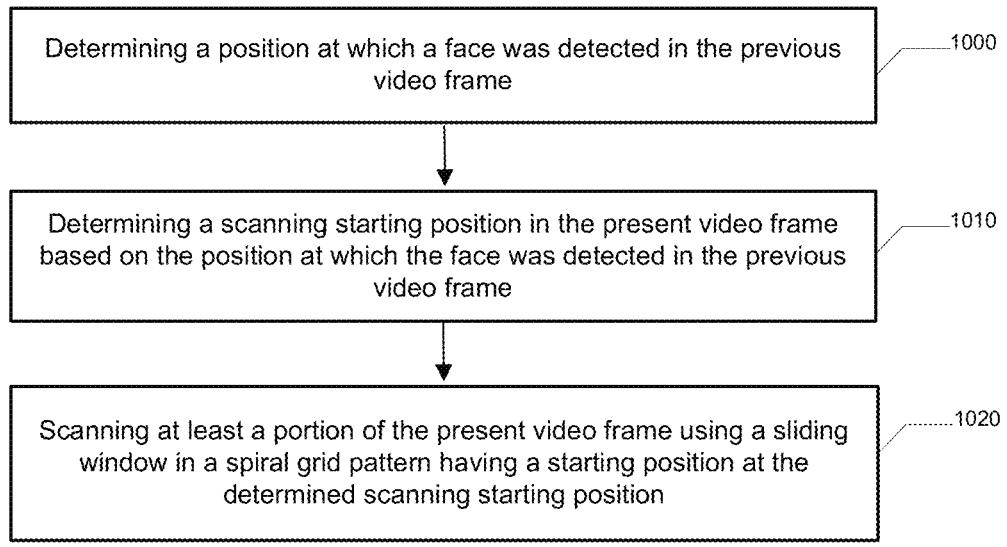
FIG. 10 illustrates a flowchart according to an example method for performing face tracking according to an example embodiment of the invention.

FIG. 10 illustrates a flowchart according to an example method for performing face tracking according to an example embodiment of the invention. The operations illustrated in and described with respect to FIG. 10 may, for example, be performed by, with the assistance of, and/or under the control of one or more of the processor 110, memory 112, communication interface 114, user interface 116, image capture circuitry, or detection circuitry 120. Operation 1000 may comprise determining a position at which a face was detected in the previous video frame. Operation 1010 may comprise determining a scanning starting position in the present video frame based on the position at which the face was detected in the previous video frame. Operation 1020 may comprise scanning at least a portion of the present video frame using a sliding window in a spiral grid pattern having a starting position at the determined scanning starting position.

FIGS. 9-10 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., a face detection apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements. In another embodiment, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and computing device users. Example embodiments provide for multi-view face detection and tracking in real time or in near real time in a manner that may be computationally less taxing than previous face tracking methods. Some example embodiments provide a one-frame-one-view detection scheme wherein a subset of face detection parameters is used for face detection in a particular frame. In this regard, performing face detection with the subset of face detection parameters may be computationally less taxing than performing face detection with an entire set of face detection parameters. Further, some such example embodiments iteratively rotate usage of subsets of face detection parameters in a sequence of video frames. Therefore, if a face is not detected with a parameter subset used in a video frame, it may be detected with a parameter subset used in a subsequent video frame. Accordingly, such embodiments may reduce computational complexity required for performing face detection in a given frame while still providing for at least substantially real time face tracking given a sufficient video frame rate.

Some example embodiments may further reduce computational complexity for face tracking by performing face detection in a portion of a frame determined based at least in part upon a position at which a face was detected in a preceding frame. For example, some example embodiments utilize a spiral grid scanning pattern to scan in an expanding spiral grid originating at a position at which a face was detected in a preceding frame. Accordingly, as face position may not vary greatly from frame to frame, scanning time and computational resources required for scanning a frame may be reduced based on a priori knowledge of a position of a face in a preceding frame.

Some example embodiments may further reduce computational complexity by estimating an image posture of an image patch prior to performing face detection in the image patch. These example embodiments utilize the estimated image posture to narrow down a set of face posture models used to perform face detection in the image patch. Accordingly, computational requirements for performing face detection within the image patch may be reduced by reducing the number of posture models used for the image patch based on the estimated image posture.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    selecting, via detection circuitry, a face detection parameter subset from a plurality of face detection parameter subsets, wherein each face detection parameter subset comprises a subset of face posture models from a set of face posture models and a subset of image patch scales from a set of image patch scales; and
    using, via the detection circuitry, the selected face detection parameter subset for performing face detection in an image, wherein performing face detection comprises scanning at least a portion of the image using a sliding window configured to be slideable along a predetermined scanning pattern, wherein using the selected face detection parameter subset for performing face detection in the image further comprises: scanning at least a portion of the image using a sliding window in a spiral grid pattern having a scanning starting position,
    wherein using the selected face detection parameter subset for performing face detection in an image comprises:
    extracting an image patch from the image;
    estimating a posture of the image patch;
    determining one or more face posture models in the selected face detection parameter subset that are applicable to the estimated posture; and
    using only the face posture models determined to be applicable to the estimated posture for performing face detection in the image patch.

2. The method according to claim 1, wherein each of the face detection parameter subsets have a substantially equal computational complexity.

3. The method according to claim 1, further comprising:
    grouping the set of face posture models into a plurality of model subsets based at least in part on computational complexity of the grouped model subsets; and
    grouping the set of image patch scales into a plurality of scale subsets based at least in part on computational complexity of the grouped scale subsets,
    wherein each face detection parameter subset comprises a model subset and a scale subset.

4. The method according to claim 1, wherein using the selected face detection parameter subset for performing face detection in the image comprises:
    extracting an image patch from each position of the sliding window; and
    using the selected face detection parameter subset for performing face detection in each image patch.

5. The method according to claim 1, wherein each model comprises a classifier trained using a plurality of face samples having one or more of a particular view or posture to detect a face having one or more of the particular view or posture.

6. The method according to claim 1, wherein the image comprises a video frame from a video.

7. The method according to claim 6, further comprising:
    selecting a face detection parameter subset for each video frame in a sequence of video frames that comprise the video; and
    using the selected face detection parameter subsets for face tracking in the sequence of video frames.

8. The method according to claim 7, further comprising:
    iteratively assigning a face detection parameter subset from the plurality of face detection parameter subsets to each video frame in the sequence of video frames; and
    wherein selecting a face detection parameter for a video frame comprises selecting the face detection parameter subset assigned to the video frame.

9. The method according to claim 6, wherein selecting a face detection parameter subset comprises selecting a face detection parameter subset based at least in part upon a face detection parameter subset used to detect a face in a preceding video frame.

10. The method according to claim 9, wherein using the selected face detection parameter subset for performing face detection in the image comprises using the selected face detection parameter subset for performing face detection in a portion of the image determined based at least in part upon a position at which a face was detected in a preceding video frame.

11. The method according to claim 6, further comprising:
    determining the scanning starting position in the image based at least in part upon a position at which a face was detected in a preceding video frame.

12. The method according to claim 1, wherein estimating the posture of the image patch comprises:
    using a feature pool to determine confidence scores for each potential rotation range in a rotation plane; and
    estimating the posture of the image patch to be one of the potential rotation ranges based at least in part upon the determined confidence scores.

13. The method according to claim 1, wherein estimating the posture of the image patch comprises using a local binary pattern feature pool to estimate the posture of the image patch.

14. An apparatus comprising at least one processor and at least one memory storing computer program code, wherein the at least one memory and stored computer program code are configured, with the at least one processor, to cause the apparatus to at least:
    select a face detection parameter subset from a plurality of face detection parameter subsets, wherein each face detection parameter subset comprises a subset of face posture models from a set of face posture models and a subset of image patch scales from a set of image patch scales; and
    use the selected face detection parameter subset for performing face detection in an image, wherein performing face detection comprises scanning at least a portion of the image using a sliding window configured to be slideable along a predetermined scanning pattern, wherein use the selected face detection parameter subset for performing face detection in the image further comprising scan at least a portion of the image using a sliding window in a spiral grid pattern having a scanning starting position,
    wherein the at least one memory and stored computer program code are configured, with the at least one processor, to cause the apparatus to use the selected face detection parameter subset for performing face detection in an image by:
    extracting an image patch from the image;
    estimating a posture of the image patch;
    determining one or more face posture models in the selected face detection parameter subset that are applicable to the estimated posture; and
    using only the face posture models determined to be applicable to the estimated posture for performing face detection in the image patch.

15. The apparatus according to claim 14, wherein each of the face detection parameter subsets have a substantially equal computational complexity.

16. The apparatus according to claim 14, wherein the at least one memory and stored computer program code are configured, with the at least one processor, to further cause the apparatus to:
- group the set of face posture models into a plurality of model subsets based at least in part on computational complexity of the grouped model subsets; and
- group the set of image patch scales into a plurality of scale subsets based at least in part on computational complexity of the grouped scale subsets,
- wherein each face detection parameter subset comprises a model subset and a scale subset.

17. The apparatus according to claim 14, wherein the at least one memory and stored computer program code are configured, with the at least one processor, to cause the apparatus to use the selected face detection parameter subset for performing face detection in the image by:
- scanning at least a portion of the image using a sliding window having a predefined size;
- extracting an image patch from each position of the sliding window; and
- using the selected face detection parameter subset for performing face detection in each image patch.

18. The apparatus according to claim 14, wherein each model comprises a classifier trained using a plurality of face samples having one or more of a particular view or posture to detect a face having one or more of the particular view or posture.

19. The apparatus according to claim 14, wherein the image comprises a video frame from a video.

20. The apparatus according to claim 19, wherein the at least one memory and stored computer program code are configured, with the at least one processor, to further cause the apparatus to:
- select a face detection parameter subset for each video frame in a sequence of video frames that comprise the video; and
- use the selected face detection parameter subsets for face tracking in the sequence of video frames.

21. The apparatus according to claim 20, wherein the at least one memory and stored computer program code are configured, with the at least one processor, to further cause the apparatus to:
- iteratively assign a face detection parameter subset from the plurality of face detection parameter subsets to each video frame in the sequence of video frames; and
- wherein the at least one memory and stored computer program code are configured, with the at least one processor, to cause the apparatus to select a face detection parameter for a video frame by selecting the face detection parameter subset assigned to the video frame.

22. The apparatus according to claim 19, wherein the at least one memory and stored computer program code are configured, with the at least one processor, to cause the apparatus to select a face detection parameter subset by selecting a face detection parameter subset based at least in part upon a face detection parameter subset used to detect a face in a preceding video frame.

23. The apparatus according to claim 19, wherein the at least one memory and stored computer program code are configured, with the at least one processor, to cause the apparatus to use the selected face detection parameter subset for performing face detection in the image by using the selected face detection parameter subset for performing face detection in a portion of the image determined based at least in part upon a position at which a face was detected in a preceding video frame.

24. The apparatus according to claim 19, wherein the at least one memory and stored computer program code are configured, with the at least one processor, to further cause the apparatus to:
- determine the scanning starting position in the image based at least in part upon a position at which a face was detected in a preceding video frame.

25. The apparatus according to claim 14, wherein the at least one memory and stored computer program code are configured, with the at least one processor, to cause the apparatus to estimate the posture of the image patch by:
- using a feature pool to determine confidence scores for each potential rotation range in a rotation plane; and
- estimating the posture of the image patch to be one of the potential rotation ranges based at least in part upon the determined confidence scores.

26. The apparatus according to claim 14, wherein the at least one memory and stored computer program code are configured, with the at least one processor, to cause the apparatus to estimate the posture of the image patch by using a local binary pattern feature pool to estimate the posture of the image patch.

27. The apparatus according to claim 14, wherein the apparatus is embodied on a mobile phone, the mobile phone comprising user interface circuitry and user interface software stored on one or more of the at least one memory; wherein the user interface circuitry and user interface software are configured to:
- facilitate user control of at least some functions of the mobile phone through use of a display; and
- cause at least a portion of a user interface of the mobile phone to be displayed on the display to facilitate user control of at least some functions of the mobile phone.

28. A computer program product comprising at least one non-transitory computer-readable storage medium having computer-readable program instructions stored therein, the computer-readable program instructions comprising:
- program instructions configured to select a face detection parameter subset from a plurality of face detection parameter subsets, wherein each face detection parameter subset comprises a subset of face posture models from a set of face posture models and a subset of image patch scales from a set of image patch scales; and
- program instructions configured to use the selected face detection parameter subset for performing face detection in an image, wherein performing face detection comprises scanning at least a portion of the image using a sliding window configured to be slideable along a predetermined scanning pattern; wherein use the selected face detection parameter subset for performing face detection in the image further comprising scan at least a portion of the image using a sliding window in a spiral grid pattern having a scanning starting position,
- wherein the program instructions that are configured to use the selected face detection parameter subset for performing face detection in an image comprises program instructions configured to:
- extract an image patch from the image;
- estimate a posture of the image patch;
- determine one or more face posture models in the selected face detection parameter subset that are applicable to the estimated posture; and
- use only the face posture models determined to be applicable to the estimated posture for performing face detection in the image patch.

* * * * *